(12) United States Patent
Taylor et al.

(10) Patent No.: US 11,872,576 B2
(45) Date of Patent: Jan. 16, 2024

(54) PULSE NOZZLE FOR FILTER CLEANING SYSTEMS

(71) Applicant: Altair (UK) Limited, Hertfordshire (GB)

(72) Inventors: Kate Taylor, Liphook (GB); Alastair Lee, Fleet (GB)

(73) Assignee: Altair (UK) Limited, Hemel Hempstead (GB)

( * ) Notice: Subject to any disclaimer, the term of this patent is extended or adjusted under 35 U.S.C. 154(b) by 542 days.

(21) Appl. No.: 16/836,987

(22) Filed: Apr. 1, 2020

(65) Prior Publication Data

US 2021/0260607 A1 Aug. 26, 2021

(30) Foreign Application Priority Data

Feb. 24, 2020 (GB) ...................................... 2002551

(51) Int. Cl.
| | |
|---|---|
| *B05B 1/26* | (2006.01) |
| *B01D 29/64* | (2006.01) |
| *B05B 1/00* | (2006.01) |
| *B01D 46/71* | (2022.01) |

(52) U.S. Cl.
CPC .......... *B05B 1/267* (2013.01); *B01D 29/6438* (2013.01); *B01D 46/71* (2022.01); *B05B 1/005* (2013.01); *B05B 1/265* (2013.01); *B01D 2201/081* (2013.01); *B01D 2201/087* (2013.01)

(58) Field of Classification Search
None
See application file for complete search history.

(56) References Cited

U.S. PATENT DOCUMENTS

| | | | | |
|---|---|---|---|---|
| 2,068,332 A | * | 1/1937 | Kneisley ................... | A47L 9/20 55/368 |
| 2,079,315 A | * | 5/1937 | Dickerson .............. | B01D 46/02 55/293 |
| 2,593,420 A | * | 4/1952 | Diehl ........................ | F02K 1/10 138/45 |

(Continued)

FOREIGN PATENT DOCUMENTS

| | | | | |
|---|---|---|---|---|
| GB | 2536219 A | * | 9/2016 | ............. B01D 46/00 |
| GB | 2592267 A | * | 8/2021 | ......... B01D 29/6438 |

(Continued)

OTHER PUBLICATIONS

Search Report for GB2002551.6 dated Jul. 22, 2020.

*Primary Examiner* — Robert J Popovics
(74) *Attorney, Agent, or Firm* — Christopher H. Hunter

(57) ABSTRACT

A nozzle for a filter cleaning system has a stub portion having an inlet opening and an outlet opening, and a splitter portion positioned downstream of the stub portion. The splitter portion has deflector surfaces arranged to direct the airflow exiting the stub portion outlet in 3 or more different/separate airstreams each of which airstreams are directed inclined axially outwardly from the axial direction of the airflow exiting the stub portion outlet opening. The various parameters of the splitter nozzle portion can be tailored to provide required jet shape and entrainment characteristics. A beneficial feature of the nozzle designs is that jet entrainment and recombination of flows can be specified for different shaped filters.

26 Claims, 6 Drawing Sheets

(56) References Cited

U.S. PATENT DOCUMENTS

| | | | | | |
|---|---|---|---|---|---|
| 2,657,702 A * | 11/1953 | Weisenbach | F02C 7/228 137/561 A |
| 2,658,625 A * | 11/1953 | Rafferty | B01D 35/02 210/497.3 |
| 2,997,845 A * | 8/1961 | Oulianoff | F02K 1/48 239/265.17 |
| 3,007,304 A * | 11/1961 | Wotton | F02K 1/123 239/455 |
| 3,061,038 A * | 10/1962 | Lawler | F02K 1/42 239/265.13 |
| 3,073,097 A * | 1/1963 | Hallett | G05D 16/163 92/36 |
| 3,133,412 A * | 5/1964 | Westley | F02K 1/48 60/230 |
| 3,169,109 A * | 2/1965 | Hirs | B01D 35/12 210/138 |
| 3,241,297 A * | 3/1966 | Hanes | B01D 46/70 55/341.3 |
| 3,256,679 A * | 6/1966 | Snyder | B01D 50/20 55/293 |
| 3,258,913 A * | 7/1966 | Moorehead | F02C 7/042 239/265.43 |
| 3,377,783 A * | 4/1968 | Young | B01D 46/521 55/432 |
| 3,383,774 A * | 5/1968 | Austin | F26B 17/103 34/364 |
| 3,394,532 A * | 7/1968 | Octiker | F16K 31/385 55/467 |
| 3,395,517 A * | 8/1968 | Lang | B01D 46/71 55/293 |
| 3,421,295 A * | 1/1969 | Swift | B01D 46/04 55/341.7 |
| 3,429,106 A * | 2/1969 | Abboud | B01D 46/04 55/293 |
| 3,436,899 A * | 4/1969 | Pausch | B01D 46/71 55/341.1 |
| 3,498,030 A * | 3/1970 | Wilki | B01D 46/71 55/341.1 |
| 3,499,268 A * | 3/1970 | Pausch | B01D 46/04 55/468 |
| 3,509,698 A * | 5/1970 | Medcalf | B01D 46/71 55/379 |
| 3,541,764 A * | 11/1970 | Astrom | B01D 50/20 55/432 |
| 3,568,415 A * | 3/1971 | Wyrough | B01D 46/448 169/42 |
| 3,594,992 A * | 7/1971 | Carr | B01D 46/71 55/368 |
| 3,606,736 A * | 9/1971 | Leliaert | B01D 46/4272 55/341.1 |
| 3,615,052 A * | 10/1971 | Tumavicus | F02K 1/006 239/265.43 |
| 3,650,348 A * | 3/1972 | Colebrook | F02K 1/40 239/265.17 |
| 3,680,285 A * | 8/1972 | Wellan | B01D 46/04 55/374 |
| 3,687,399 A * | 8/1972 | Tumavicus | F02K 1/52 244/55 |
| 3,726,066 A * | 4/1973 | Colley | B01D 50/20 55/341.6 |
| 3,733,784 A * | 5/1973 | Anderson | B03C 3/155 55/379 |
| 3,757,497 A * | 9/1973 | Ray | B01D 46/71 137/861 |
| 3,798,878 A * | 3/1974 | Pausch | B01D 46/04 55/293 |
| 3,816,978 A * | 6/1974 | O'Dell | B01D 46/71 95/280 |
| 3,816,979 A * | 6/1974 | Wales | B01D 46/71 95/280 |
| 3,838,555 A * | 10/1974 | Kubiak | B01D 46/71 55/293 |
| 3,844,750 A * | 10/1974 | Ray | B01D 46/02 55/379 |
| 3,853,509 A * | 12/1974 | Leliaert | B01D 46/71 55/378 |
| 3,874,857 A * | 4/1975 | Hunt | B01D 46/4281 55/379 |
| 3,884,657 A * | 5/1975 | Rebours | B01D 46/70 55/374 |
| 3,890,290 A * | 6/1975 | McCabe | B01D 46/02 210/136 |
| 3,891,418 A * | 6/1975 | Burger | B01D 46/4281 55/293 |
| 3,926,595 A * | 12/1975 | Bockman | B01D 46/04 55/335 |
| 3,942,962 A * | 3/1976 | Duyckinck | B01D 46/71 417/195 |
| 3,954,426 A * | 5/1976 | Brange | B01D 46/71 95/280 |
| 3,973,731 A * | 8/1976 | Thayer | F02K 1/12 239/265.29 |
| 3,976,160 A * | 8/1976 | Hoch | F02K 1/42 239/265.39 |
| 3,980,233 A * | 9/1976 | Simmons | F23D 11/107 239/404 |
| 4,033,732 A * | 7/1977 | Axelsson | B01D 46/71 137/590 |
| 4,073,632 A * | 2/1978 | Reinauer | B01D 46/71 55/374 |
| 4,113,449 A * | 9/1978 | Bundy | B01D 46/04 95/286 |
| 4,155,850 A * | 5/1979 | Rathbone | B01D 35/12 210/333.1 |
| 4,157,899 A * | 6/1979 | Wheaton | B01D 46/04 96/427 |
| 4,157,901 A * | 6/1979 | Schaltenbrand | B01D 46/06 55/379 |
| 4,159,197 A * | 6/1979 | Schuler | B01D 46/4281 210/462 |
| 4,171,963 A * | 10/1979 | Schuler | B01D 46/521 55/284 |
| 4,218,227 A * | 8/1980 | Frey | B01D 46/2411 55/498 |
| 4,251,244 A * | 2/1981 | Evenstad | B01D 46/0005 55/379 |
| 4,253,856 A * | 3/1981 | Paucha | B01D 46/71 55/374 |
| 4,272,263 A * | 6/1981 | Hancock | B01D 46/4281 55/377 |
| 4,278,454 A * | 7/1981 | Nemesi | B01D 50/20 55/498 |
| 4,289,511 A * | 9/1981 | Johnson, Jr. | B01D 46/06 55/379 |
| 4,292,057 A * | 9/1981 | Ulvestad | B01D 46/0005 55/377 |
| 4,297,115 A * | 10/1981 | Johnson, Jr. | B01D 46/06 55/379 |
| 4,319,897 A * | 3/1982 | Labadie | B01D 46/58 417/198 |
| 4,356,010 A * | 10/1982 | Meyer zu Riemsloh | B01D 46/04 55/379 |
| 4,395,269 A * | 7/1983 | Schuler | B01D 46/521 55/508 |
| 4,422,524 A * | 12/1983 | Osborn | F02K 1/383 60/230 |
| 4,424,070 A * | 1/1984 | Robinson | B01D 46/4281 55/378 |
| 4,433,986 A * | 2/1984 | Borst | B01D 46/04 96/428 |
| 4,436,536 A * | 3/1984 | Robinson | B01D 46/521 55/498 |
| 4,443,237 A * | 4/1984 | Ulvestad | B01D 46/2411 55/498 |
| 4,445,915 A * | 5/1984 | Robinson | B01D 46/2411 55/378 |

(56) References Cited

U.S. PATENT DOCUMENTS

| | | | | |
|---|---|---|---|---|
| 4,452,616 A * | 6/1984 | Gillingham | B01D 46/71 | 55/498 |
| 4,465,497 A * | 8/1984 | Howeth | B01D 46/71 | 406/137 |
| 4,468,240 A * | 8/1984 | Margraf | F23J 15/025 | 55/303 |
| 4,504,288 A * | 3/1985 | Kreft | B01D 46/4281 | 55/379 |
| 4,514,193 A * | 4/1985 | Booth | B01D 50/20 | 55/290 |
| 4,536,200 A * | 8/1985 | Reist | B01D 46/71 | 95/280 |
| 4,539,025 A * | 9/1985 | Ciliberti | B01D 46/71 | 55/378 |
| 4,565,631 A * | 1/1986 | Bitzer | B01D 29/031 | 210/411 |
| 4,578,092 A * | 3/1986 | Klimczak | B01D 46/4281 | 55/302 |
| 4,582,605 A * | 4/1986 | Rea | B01D 29/35 | 210/450 |
| 4,632,680 A * | 12/1986 | Klimczak | B01D 46/0004 | 55/379 |
| 4,637,473 A * | 1/1987 | Gillis | A62C 37/00 | 55/432 |
| 4,638,947 A * | 1/1987 | Jaqua | F02K 9/976 | 239/265.43 |
| 4,645,520 A * | 2/1987 | Huttlin | B01D 46/71 | 55/508 |
| 4,655,603 A * | 4/1987 | Palm | B01F 33/409 | 239/590.5 |
| 4,666,472 A * | 5/1987 | Klimczak | B01D 46/521 | 55/303 |
| 4,680,038 A * | 7/1987 | Titus | B01D 29/908 | 55/380 |
| 4,690,700 A * | 9/1987 | Howeth | B01D 46/48 | 137/625.48 |
| 4,707,899 A * | 11/1987 | Singer | F02K 9/97 | 72/379.6 |
| 4,726,820 A * | 2/1988 | Stanelle | B01D 46/446 | 55/293 |
| 4,735,638 A * | 4/1988 | Ciliberti | F16F 1/04 | 55/498 |
| 4,738,696 A * | 4/1988 | Staffeld | B01D 46/4281 | 95/286 |
| 4,754,926 A * | 7/1988 | Singer | F02K 9/976 | 239/265.43 |
| 4,764,191 A * | 8/1988 | Morelli | B01D 46/0043 | 55/482 |
| 4,770,118 A * | 9/1988 | Vohringer | B05B 16/25 | 55/497 |
| 4,786,293 A * | 11/1988 | Labadie | B01D 46/71 | 95/20 |
| 4,789,387 A * | 12/1988 | Nemesi | B01D 46/04 | 95/280 |
| 4,806,243 A * | 2/1989 | Jackson | B01D 29/6438 | 210/338 |
| 4,836,834 A * | 6/1989 | Steele | B01D 46/71 | 95/279 |
| 4,865,627 A * | 9/1989 | Dewitz | B01D 46/46 | 95/286 |
| 4,878,617 A * | 11/1989 | Novotny | F02K 1/1223 | 239/265.41 |
| 4,941,617 A * | 7/1990 | Russell | F23D 11/107 | 239/406 |
| 5,002,594 A * | 3/1991 | Merritt | B01D 46/90 | 55/294 |
| 5,062,867 A * | 11/1991 | Klimczak | B01D 46/04 | 95/280 |
| 5,062,873 A * | 11/1991 | Karlsson | B01D 46/2411 | 55/379 |
| 5,167,676 A * | 12/1992 | Nakaishi | B01D 46/2407 | 60/303 |
| 5,178,652 A * | 1/1993 | Huttlin | B01J 8/006 | 95/286 |
| 5,393,327 A * | 2/1995 | Chambers | B01D 46/2414 | 55/498 |
| 5,395,409 A * | 3/1995 | Klimczak | B01D 46/0005 | 95/280 |
| 5,409,512 A * | 4/1995 | Wilkerson | B01D 46/71 | 15/340.1 |
| 5,435,126 A * | 7/1995 | Beaudoin | F23D 14/24 | 60/737 |
| 5,437,412 A * | 8/1995 | Carletti | F02K 1/008 | 60/770 |
| 5,545,318 A * | 8/1996 | Richmond | B01D 29/15 | 210/232 |
| 5,549,734 A * | 8/1996 | Standard | B01D 46/71 | 95/279 |
| 5,555,909 A * | 9/1996 | Elliott | B01D 46/4272 | 137/359 |
| 5,562,251 A * | 10/1996 | Elliott | B01D 46/04 | 239/433 |
| 5,562,746 A * | 10/1996 | Raether | B01D 46/4281 | 95/280 |
| 5,575,826 A * | 11/1996 | Gillingham | B01D 46/10 | 55/284 |
| 5,584,913 A * | 12/1996 | Williams | B01D 46/71 | 55/424 |
| 5,616,171 A * | 4/1997 | Barris | F01N 3/22 | 55/282.3 |
| 5,799,872 A * | 9/1998 | Nesbitt | F23K 5/18 | 239/113 |
| 5,837,017 A * | 11/1998 | Santschi | B01D 46/71 | 95/20 |
| 5,887,797 A * | 3/1999 | Elliott | B01D 46/4281 | 239/550 |
| 5,941,065 A * | 8/1999 | Lidstone | F02K 1/085 | 239/265.17 |
| 6,022,388 A * | 2/2000 | Andersson | B01D 46/04 | 95/280 |
| 6,056,796 A * | 5/2000 | Chiang | B01D 46/2407 | 55/482 |
| 6,070,830 A * | 6/2000 | Mueller | F02K 1/48 | 239/265.17 |
| 6,112,850 A * | 9/2000 | Secrest | F04D 29/663 | 454/906 |
| 6,129,852 A * | 10/2000 | Elliott | B01D 29/684 | 210/791 |
| 6,149,716 A * | 11/2000 | Bach | B01D 46/71 | 96/233 |
| 6,164,563 A * | 12/2000 | Bouiller | F02K 1/825 | 60/771 |
| 6,247,317 B1 * | 6/2001 | Kostka | F23C 7/02 | 60/741 |
| 6,289,676 B1 * | 9/2001 | Prociw | F23D 11/383 | 60/740 |
| 6,302,931 B1 * | 10/2001 | Min | B01D 46/4272 | 95/280 |
| 6,332,902 B1 * | 12/2001 | Simonsen | B01D 46/71 | 55/302 |
| 6,365,054 B1 * | 4/2002 | Kruger | B01D 29/52 | 210/411 |
| 6,551,368 B1 * | 4/2003 | Kordas | B01D 46/4281 | 95/280 |
| 6,554,138 B1 * | 4/2003 | Bihlet | B01D 46/24 | 210/411 |
| 6,622,488 B2 * | 9/2003 | Mansour | F23D 11/107 | 239/405 |
| 6,658,988 B1 * | 12/2003 | Dries | B01D 46/2407 | 55/284 |
| 6,716,274 B2 * | 4/2004 | Gogins | D01F 6/92 | 55/528 |
| 6,884,360 B2 * | 4/2005 | Chang | B01D 29/86 | 210/248 |
| 6,902,592 B2 * | 6/2005 | Green | B01D 46/4281 | 55/293 |
| 7,111,448 B2 * | 9/2006 | Anderson | F02K 3/02 | 239/265.17 |

(56) References Cited

U.S. PATENT DOCUMENTS

| | | | | |
|---|---|---|---|---|
| 7,195,659 B2* | 3/2007 | Sporre | ............... | B01D 46/4281 210/791 |
| 7,240,493 B2* | 7/2007 | Seiner | ............... | F02K 1/12 60/770 |
| 7,282,075 B2* | 10/2007 | Sporre | ............... | B01D 46/525 210/411 |
| 7,309,366 B2* | 12/2007 | Jensen | ............... | B01D 46/682 55/284 |
| 7,311,823 B2* | 12/2007 | Brooke | ............... | B01D 41/04 134/182 |
| 7,338,544 B2* | 3/2008 | Sporre | ............... | B01D 46/525 95/286 |
| 7,406,827 B1* | 8/2008 | Bernero | ............... | F23D 17/002 431/162 |
| 7,434,384 B2* | 10/2008 | Lord | ............... | F02K 1/386 181/220 |
| 7,475,548 B2* | 1/2009 | Toffan | ............... | F02K 1/008 239/265.35 |
| 7,475,550 B2* | 1/2009 | Seiner | ............... | F02K 1/48 277/634 |
| 7,481,038 B2* | 1/2009 | Blozy | ............... | F02K 1/822 60/228 |
| 7,485,163 B2* | 2/2009 | Yoshimoto | ............... | B01D 46/2407 210/791 |
| 7,517,393 B2* | 4/2009 | Richard | ............... | B01D 46/2407 55/498 |
| 7,585,343 B2* | 9/2009 | Clements | ............... | B01D 46/71 95/280 |
| 7,833,329 B2* | 11/2010 | Mahon, III | ............... | B01D 46/4281 95/280 |
| 7,918,907 B2* | 4/2011 | Bitner | ............... | B01D 46/715 55/293 |
| 7,918,908 B2* | 4/2011 | Nahey | ............... | B01D 46/04 95/280 |
| 7,947,099 B2* | 5/2011 | Valentini | ............... | A47L 9/20 55/284 |
| 7,964,007 B2* | 6/2011 | Kim | ............... | B01D 46/70 55/378 |
| 7,967,898 B2* | 6/2011 | Sporre | ............... | B01D 46/525 95/286 |
| 8,029,583 B2* | 10/2011 | Ferguson | ............... | B01D 45/16 55/294 |
| 8,029,607 B2* | 10/2011 | Ray | ............... | B01D 46/04 95/280 |
| 8,069,647 B2* | 12/2011 | Anderson | ............... | F02K 3/02 239/265.17 |
| 8,075,648 B2* | 12/2011 | Raether | ............... | B01D 46/71 95/280 |
| 8,075,674 B2* | 12/2011 | Raether | ............... | B01D 46/2411 95/280 |
| 8,114,196 B2* | 2/2012 | Lamee | ............... | F02C 7/05 95/280 |
| 8,118,900 B2* | 2/2012 | Raether | ............... | B01D 46/71 95/280 |
| 8,142,551 B2* | 3/2012 | Prud'homme | ............... | B01D 46/2411 95/107 |
| 8,220,420 B2* | 7/2012 | Taylor | ............... | F28G 7/00 134/167 R |
| 8,231,715 B2* | 7/2012 | Gross | ............... | B01D 46/2403 55/482 |
| 8,307,659 B2* | 11/2012 | Rose | ............... | F02K 1/48 60/770 |
| 8,349,044 B2* | 1/2013 | Raether | ............... | B01D 46/58 95/280 |
| 8,382,869 B2* | 2/2013 | Jarrier | ............... | B01D 46/71 55/341.6 |
| 8,382,870 B2* | 2/2013 | Troxell | ............... | B01D 46/4272 55/385.3 |
| 8,404,021 B2* | 3/2013 | Gillingham | ............... | B01D 46/4272 55/428 |
| 8,484,976 B2* | 7/2013 | Leland | ............... | B64D 33/06 60/725 |
| 8,491,708 B2* | 7/2013 | Raether | ............... | B01D 46/04 95/280 |
| 8,496,821 B2* | 7/2013 | Ringenberger | ............... | B01D 29/902 210/232 |
| 8,534,467 B2* | 9/2013 | Haas | ............... | E03B 7/07 285/354 |
| 8,549,850 B2* | 10/2013 | Janakiraman | ............... | F01N 3/05 60/319 |
| 8,580,004 B1* | 11/2013 | Clements | ............... | B01D 46/521 55/378 |
| 8,617,276 B2* | 12/2013 | Raether | ............... | B01D 46/526 55/378 |
| 8,673,066 B2* | 3/2014 | Koyama | ............... | B01D 46/715 96/427 |
| 8,691,001 B2* | 4/2014 | Boatwright, Jr. | ............... | B01D 46/04 55/284 |
| 8,747,533 B1* | 6/2014 | Ekanayake | ............... | B01D 46/0086 96/417 |
| 8,758,486 B2* | 6/2014 | Raether | ............... | B01D 46/71 95/280 |
| 8,864,913 B2* | 10/2014 | Haynam | ............... | B01D 46/71 95/279 |
| 8,876,928 B2* | 11/2014 | Szczap | ............... | B01D 46/71 55/288 |
| 8,894,744 B2* | 11/2014 | Appelo | ............... | B01D 46/71 95/20 |
| 8,899,048 B2* | 12/2014 | Prociw | ............... | F23R 3/54 60/737 |
| 8,910,480 B2* | 12/2014 | Suria | ............... | F23D 11/107 60/737 |
| 8,951,321 B2* | 2/2015 | Gillingham | ............... | B01D 46/52 55/484 |
| 8,984,889 B2* | 3/2015 | Wilbraham | ............... | F23R 3/286 60/737 |
| 9,067,164 B2* | 6/2015 | Raether | ............... | B01D 46/71 |
| 9,108,135 B2* | 8/2015 | Gillingham | ............... | B01D 46/2411 |
| 9,126,132 B2* | 9/2015 | Raether | ............... | B01D 46/2411 |
| 9,162,234 B2* | 10/2015 | Raether | ............... | B05B 1/005 |
| 9,186,612 B2* | 11/2015 | Wahlquist | ............... | B01D 46/0005 |
| 9,200,568 B1* | 12/2015 | Kippel | ............... | B01D 46/60 |
| 9,221,002 B2* | 12/2015 | Shellenberger | ............... | B01D 46/71 |
| 9,309,841 B2* | 4/2016 | Troxell | ............... | B01D 46/0086 |
| 9,464,808 B2* | 10/2016 | Paskevich | ............... | F23R 3/286 |
| 9,604,172 B2* | 3/2017 | Raether | ............... | B01D 46/60 |
| 9,718,018 B2* | 8/2017 | Haynam | ............... | B01D 46/71 |
| 9,731,240 B2* | 8/2017 | Koyama | ............... | C10J 3/84 |
| 9,737,837 B2* | 8/2017 | Wahlquist | ............... | B01D 46/48 |
| 9,757,673 B2* | 9/2017 | Gillingham | ............... | B01D 46/48 |
| 9,795,908 B2* | 10/2017 | Raether | ............... | B01D 46/71 |
| 9,897,111 B2* | 2/2018 | Mornan | ............... | F24F 13/26 |
| 9,976,515 B2* | 5/2018 | Akatsuka | ............... | F02K 1/46 |
| 10,035,095 B2* | 7/2018 | Joshi | ............... | B01D 46/2403 |
| 10,245,543 B2* | 4/2019 | Raether | ............... | B01D 46/60 |
| 10,364,751 B2* | 7/2019 | Ryon | ............... | F23R 3/346 |
| 10,378,477 B2* | 8/2019 | Pesyna | ............... | F02K 1/123 |
| 10,391,428 B2* | 8/2019 | Holopainen | ............... | B01D 29/94 |
| 10,406,458 B1* | 9/2019 | Nehlen, III | ............... | B01D 29/52 |
| 10,408,454 B2* | 9/2019 | Lee | ............... | F23R 3/14 |
| 10,512,870 B2* | 12/2019 | Gillingham | ............... | B01D 46/71 |
| 10,556,198 B2* | 2/2020 | Raether | ............... | B01D 46/71 |
| 10,675,578 B2* | 6/2020 | Wahlquist | ............... | B01D 46/48 |
| 10,751,764 B2* | 8/2020 | Dagan | ............... | B08B 5/04 |
| 10,773,202 B2* | 9/2020 | Johnson | ............... | B01D 46/71 |
| 10,814,256 B2* | 10/2020 | Nehlen, III | ............... | B01D 29/15 |
| 10,814,262 B2* | 10/2020 | Jackson | ............... | B01D 46/71 |
| 10,955,138 B2* | 3/2021 | Wirtz | ............... | F23R 3/14 |
| 10,967,320 B2* | 4/2021 | Gillingham | ............... | B01D 46/71 |
| 11,000,791 B2* | 5/2021 | Jibert | ............... | B01D 33/23 |
| 11,111,888 B2* | 9/2021 | Prociw | ............... | F02M 31/20 |
| 11,123,671 B2* | 9/2021 | Raether | ............... | B01D 46/4281 |
| 11,167,235 B2* | 11/2021 | Johnson | ............... | B01D 46/521 |
| 11,291,935 B2* | 4/2022 | Jibert | ............... | B05B 1/202 |
| 11,364,509 B2* | 6/2022 | Sturdy | ............... | B05B 15/68 |
| 11,371,706 B2* | 6/2022 | Harper | ............... | F02C 3/30 |
| 11,391,463 B2* | 7/2022 | Wirtz | ............... | F23R 3/28 |
| 11,433,344 B2* | 9/2022 | Handte | ............... | B01D 46/2411 |
| 11,471,798 B2* | 10/2022 | Vallejo | ............... | C02F 1/006 |

(56) References Cited

U.S. PATENT DOCUMENTS

| | | | | |
|---|---|---|---|---|
| 11,673,079 B2* | 6/2023 | Nehlen, III | ............ | B01D 29/17 210/323.2 |
| 11,712,650 B2* | 8/2023 | Johnson | ................. | B01D 46/58 55/379 |
| 11,717,775 B2* | 8/2023 | Maiworm | .............. | B01D 29/52 210/323.1 |
| 11,738,296 B2* | 8/2023 | Stark | ...................... | B01D 46/48 210/232 |
| 11,745,133 B2* | 9/2023 | Raether | .............. | B01D 46/4281 95/287 |
| 11,801,464 B2* | 10/2023 | Jibert | ..................... | B01D 33/50 |
| 2004/0035091 A1* | 2/2004 | Wang | ..................... | B01D 46/71 55/283 |
| 2004/0079231 A1* | 4/2004 | Green | ................ | B01D 46/4281 95/280 |
| 2004/0187689 A1* | 9/2004 | Sporre | ................. | B01D 46/121 95/286 |
| 2005/0120881 A1* | 6/2005 | Sporre | ...................... | F16K 7/14 95/280 |
| 2005/0252178 A1* | 11/2005 | Richard | ................. | B01D 46/60 55/302 |
| 2006/0060544 A1* | 3/2006 | Brooke | ................. | B01D 41/04 210/791 |
| 2006/0075726 A1* | 4/2006 | Yoshimoto | ........... | B01D 46/715 55/302 |
| 2006/0112667 A1* | 6/2006 | Sporre | ................. | B01D 46/525 55/380 |
| 2007/0039290 A1* | 2/2007 | Lee | ...................... | B01D 46/715 55/302 |
| 2007/0137151 A1* | 6/2007 | Sporre | ................ | B01D 46/4281 55/302 |
| 2008/0022855 A1* | 1/2008 | Clements | ............... | B01D 46/71 95/280 |
| 2008/0022856 A1* | 1/2008 | Clements | ............... | B01D 46/04 95/280 |
| 2008/0127827 A1* | 6/2008 | Raether | ................. | B01D 46/58 95/280 |
| 2008/0127828 A1* | 6/2008 | Raether | ................. | B01D 46/72 134/37 |
| 2008/0271607 A1* | 11/2008 | Mahon | ............... | B01D 46/2407 96/421 |
| 2009/0107337 A1* | 4/2009 | Vu | .......................... | B01D 46/71 95/279 |
| 2009/0166301 A1* | 7/2009 | Ringenberger | ....... | B01D 29/111 210/232 |
| 2009/0217630 A1* | 9/2009 | Bitner | .................. | B01D 46/715 55/294 |
| 2010/0107616 A1* | 5/2010 | Janakiraman | ......... | F01N 13/082 60/320 |
| 2011/0011042 A1* | 1/2011 | Gillingham | ............ | B01D 46/48 55/302 |
| 2011/0048236 A1* | 3/2011 | Lamee | ................... | B01D 46/42 95/280 |
| 2011/0114195 A1* | 5/2011 | Haas | ....................... | F16L 55/24 137/15.01 |
| 2011/0209612 A1* | 9/2011 | Bansal | ................ | B01D 46/2407 55/482 |
| 2011/0252964 A1* | 10/2011 | Wahlquist | .......... | B01D 46/0042 95/20 |
| 2012/0067381 A1* | 3/2012 | Raether | .................. | B01D 46/72 134/37 |
| 2012/0073251 A1* | 3/2012 | Troxell | .............. | B01D 46/2403 55/302 |
| 2012/0234775 A1* | 9/2012 | Holopainen | ........... | B01D 29/66 210/791 |
| 2013/0125754 A1* | 5/2013 | Johnson | ................. | B01D 46/04 95/278 |
| 2013/0133298 A1* | 5/2013 | Troxell | .................. | B01D 46/71 55/283 |
| 2013/0219839 A1* | 8/2013 | Gillingham | ........ | B01D 46/2411 55/283 |
| 2013/0220125 A1* | 8/2013 | Heidenreich | .......... | B01D 46/71 95/280 |
| 2013/0298772 A1* | 11/2013 | Raether | .................. | B01D 46/71 95/279 |
| 2014/0001744 A1* | 1/2014 | Haas | ...................... | B01D 35/02 285/5 |
| 2014/0059982 A1* | 3/2014 | Koyama | ................ | C10K 1/024 55/302 |
| 2014/0245704 A1* | 9/2014 | Raether | .............. | B01D 46/2411 55/302 |
| 2014/0291418 A1* | 10/2014 | Ruffing | .................. | F02C 7/232 239/403 |
| 2014/0299682 A1* | 10/2014 | Raether | .................. | B05B 1/005 239/568 |
| 2015/0176545 A1* | 6/2015 | Troxell | ................. | F02M 35/086 55/302 |
| 2015/0182897 A1* | 7/2015 | Ji | ........................... | B01D 46/60 55/302 |
| 2015/0343362 A1* | 12/2015 | Gillingham | ............ | B01D 46/48 55/302 |
| 2016/0016103 A1* | 1/2016 | Raether | .................. | B01D 46/60 55/302 |
| 2016/0082380 A1* | 3/2016 | Seitz | ...................... | B01D 46/58 95/286 |
| 2017/0072344 A1* | 3/2017 | Powell | ................... | B01D 41/04 |
| 2017/0252691 A1* | 9/2017 | Johnson | ................ | B01D 29/19 |
| 2018/0071669 A1* | 3/2018 | Jackson | ............ | B01D 46/2411 |
| 2019/0291028 A1* | 9/2019 | Nehlen, III | ............ | B01D 37/02 |
| 2020/0023386 A1* | 1/2020 | Sturdy | ................... | B05B 17/08 |
| 2020/0368663 A1* | 11/2020 | Johnson | ................ | B01D 46/58 |
| 2021/0039023 A1* | 2/2021 | Nehlen, III | ............ | B01D 29/52 |
| 2021/0229006 A1* | 7/2021 | Nehlen, III | ............ | B01D 29/52 |
| 2021/0260607 A1* | 8/2021 | Taylor | .................... | B05B 1/265 |
| 2022/0118393 A1* | 4/2022 | Johnson | ................ | B01D 46/58 |
| 2023/0001335 A1* | 1/2023 | Powell | ................... | B01D 29/52 |
| 2023/0226478 A1* | 7/2023 | Bauer | ................... | B01D 46/71 55/302 |

FOREIGN PATENT DOCUMENTS

| | | | | |
|---|---|---|---|---|
| IN | | 295334 | 3/2018 | |
| WO | WO-9603195 A1 * | | 2/1996 | ........... B01D 29/114 |
| WO | WO-2016142172 A1 * | | 9/2016 | ............ B01D 46/00 |
| WO | WO-2021170985 A1 * | | 9/2021 | ........ B01D 29/6438 |

* cited by examiner

PULSE NOZZLE FOR FILTER CLEANING SYSTEMS

FIELD OF THE INVENTION

The present invention relates to a pulse nozzle for filter cleaning systems, and filter cleaning systems using such pulse nozzles.

BACKGROUND OF THE INVENTION

Pulse-cleaning systems for air filters use short pulses of compressed air to reverse the normal airflow in the filter and remove the dust from the filter media. Such systems are referred to as reverse-flow filter cleaning systems. The air is delivered through a nozzle which may be specially designed to increase the amount of entrainment into the resulting jet and thus the reverse airflow through the filter.

In order to optimise/maximise the cleaning flow for a given filter shape within a defined envelope, it is necessary to give consideration to the shape and distribution of the nozzle(s) and the velocity profile of the resulting jet.

For example, pyramid filters such as disclosed in U.S. Pat. No. 8,440,002, use a 3 or 4-sided configuration which may not be cleaned effectively with a round jet or bifurcated jet as typically used for cylindrical or conical filters. Also, increasing the entrainment rate may enable the nozzle(s) to clean effectively, while reducing the distance between the nozzle exit plane and the filter and thus the overall size and cost of the filter house.

U.S. Pat. No. 7,195,659 discloses at FIG. 11 onwards various configurations of pulse nozzles that the present invention seeks to improve upon.

Previous work has been conducted on improving nozzle design for round cartridge filters and a range of different designs is in use. An exemplary design is shown in, for example, U.S. Pat. No. 7,585,343.

In US Patent Publ. 2007/0137151, the nozzle configuration uses multiple outlets directing pulsed air across thin wedges to attempt a similar effect for a large V-type filter.

SUMMARY OF THE INVENTION

An improved arrangement has now been devised.
The improved nozzle comprises:
i) a stub portion having an inlet opening and an outlet opening; and,
ii) a splitter portion positioned downstream of the stub portion; wherein the splitter portion has deflector surfaces arranged to direct the airflow exiting the stub portion outlet in three or more different/separate airstreams each of which airstreams are directed inclined axially outward from the axial direction of the airflow exiting the stub portion outlet.

It is preferred that the deflector surfaces directing each airstream are substantially planar.

It is preferred that, for each airstream, two or more inclined deflector surfaces are provided, meeting at one or more intersections.

It is preferred that the intersections are linear and preferably are inclined axially outwardly from the axial direction of the stub portion.

It is preferred that the stub portion has a single/common outlet opening, which single/common outlet directs the airflow onto each of the deflector surfaces.

It is preferred that the outlet opening of the stub portion comprises a circular aperture.

It is preferred that the splitter portion is formed to have spacer sections (such as bridges, walls or webs) to separate the different/separate airstreams.

It is preferred that the spacer sections are present extending between adjacent deflector surfaces of the different/separate airstreams.

It is preferred that the spacer sections run longitudinally along the length of the splitter portion and are inclined axially outwardly from stub axis.

It is preferred that the spacer sections are each inclined axially at the same angle of inclination.

It is preferred that the spacer sections extend from the stub portion.

It is preferred that the deflector surfaces for each airstream define an airstream channel.

It is preferred that each airstream channel is of the same shape and configuration as the other separate airstream channels of the nozzle.

It is preferred that the splitter portion has a deflector surface leading edge configuration in which the airflow exiting the stub outlet is split into the different/separate airstreams at a common point along the longitudinal axis of the nozzle.

It is preferred that the splitter portion has a deflector surface leading edge configuration in which the airflow exiting the stub outlet is split into the different/separate airstreams, the leading edge being positioned contiguous with (or close to) the outlet opening of the stub portion. By 'close to' it is to be understood a distance of substantially 10 mm or less.

It is preferred that the splitter portion has a deflector surface leading edge configuration in which the airflow exiting the stub outlet is split into the different/separate airstreams, the deflector surface leading edge configuration extending transversely across the entirety of the outlet opening of the stub portion.

It is preferred that the nozzle further comprises a source of compressed air and means for delivering the compressed air to the nozzle.

It is preferred that the system includes a pulsation system for pulsing the air delivered to the nozzle.

BRIEF DESCRIPTION OF THE DRAWINGS

The invention will now be further described, by way of example only, and with reference to the accompanying drawings, in which.

DETAILED DESCRIPTION OF THE PREFERRED EMBODIMENT

Figure 1:
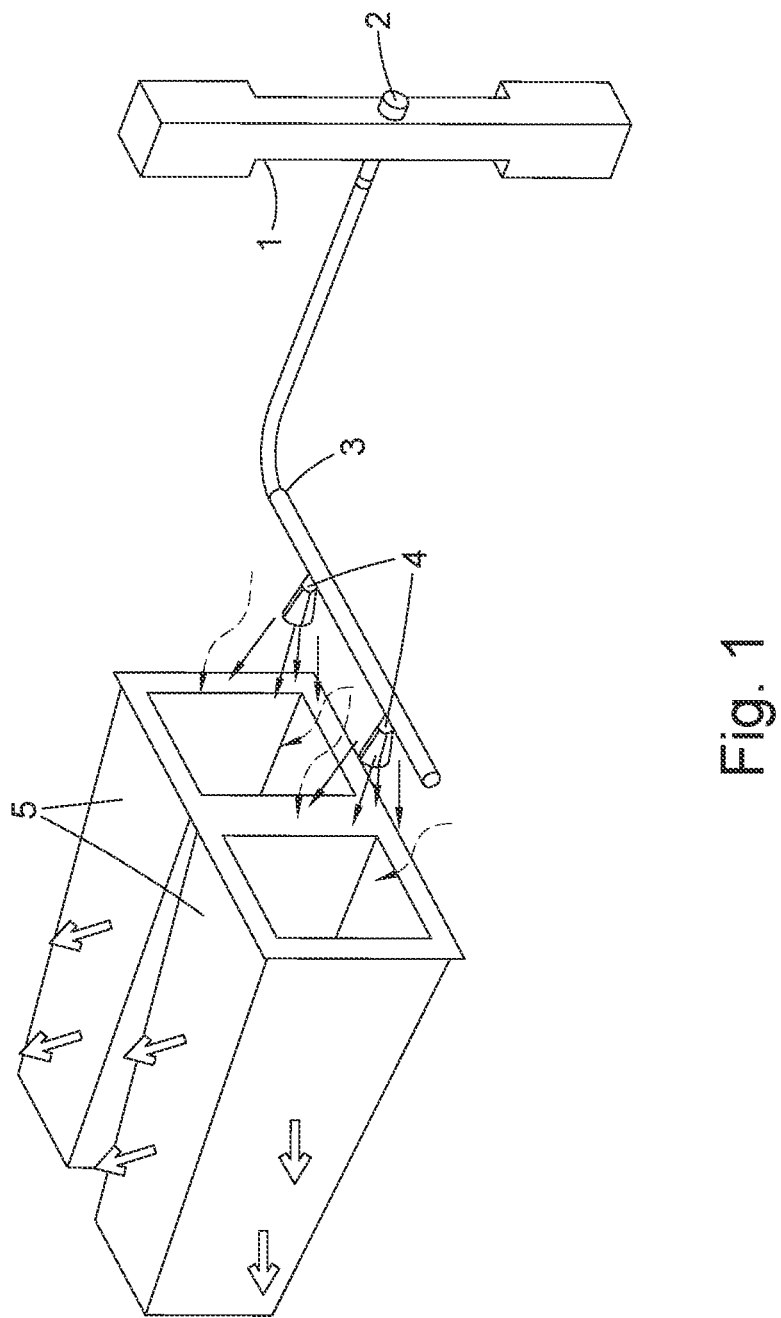
FIG. 1 is a schematic view of a filter cleaning system in accordance with the invention.

A reverse-flow pulsed filter cleaning system is shown in FIG. 1. The system is suitable for use in relation to generally known industrial applications such as that described in U.S. Pat. No. 7,195,659 for cleaning, for example, filter arrangements provided for a gas intake system for a gas turbine system. The reverse-flow pulsed filter cleaning system shown in FIG. 1 comprises a compressed air header 1 with a number of pulse valves 2, each of which is connected to a blowpipe 3. The blowpipe 3 delivers a short pulse of compressed air to one or more nozzles 4. Each nozzle directs the resulting pulse jet in such a way as to reverse the air flow through a single filter 5. The nozzle may be attached to the side of the blowpipe via a saddle (as shown at 6) or mated directly to the open end of the blowpipe.

Figure 2:
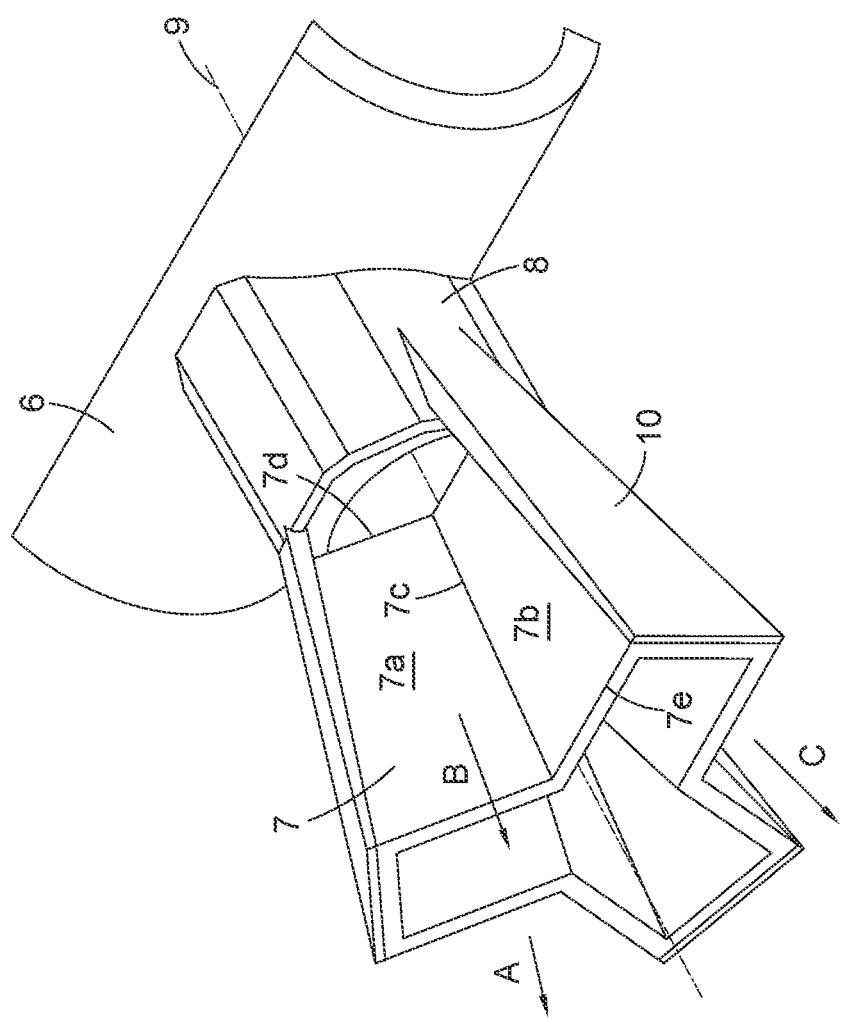
FIG. 2 is a perspective view of an embodiment of a nozzle according to the invention.
Figure 3:
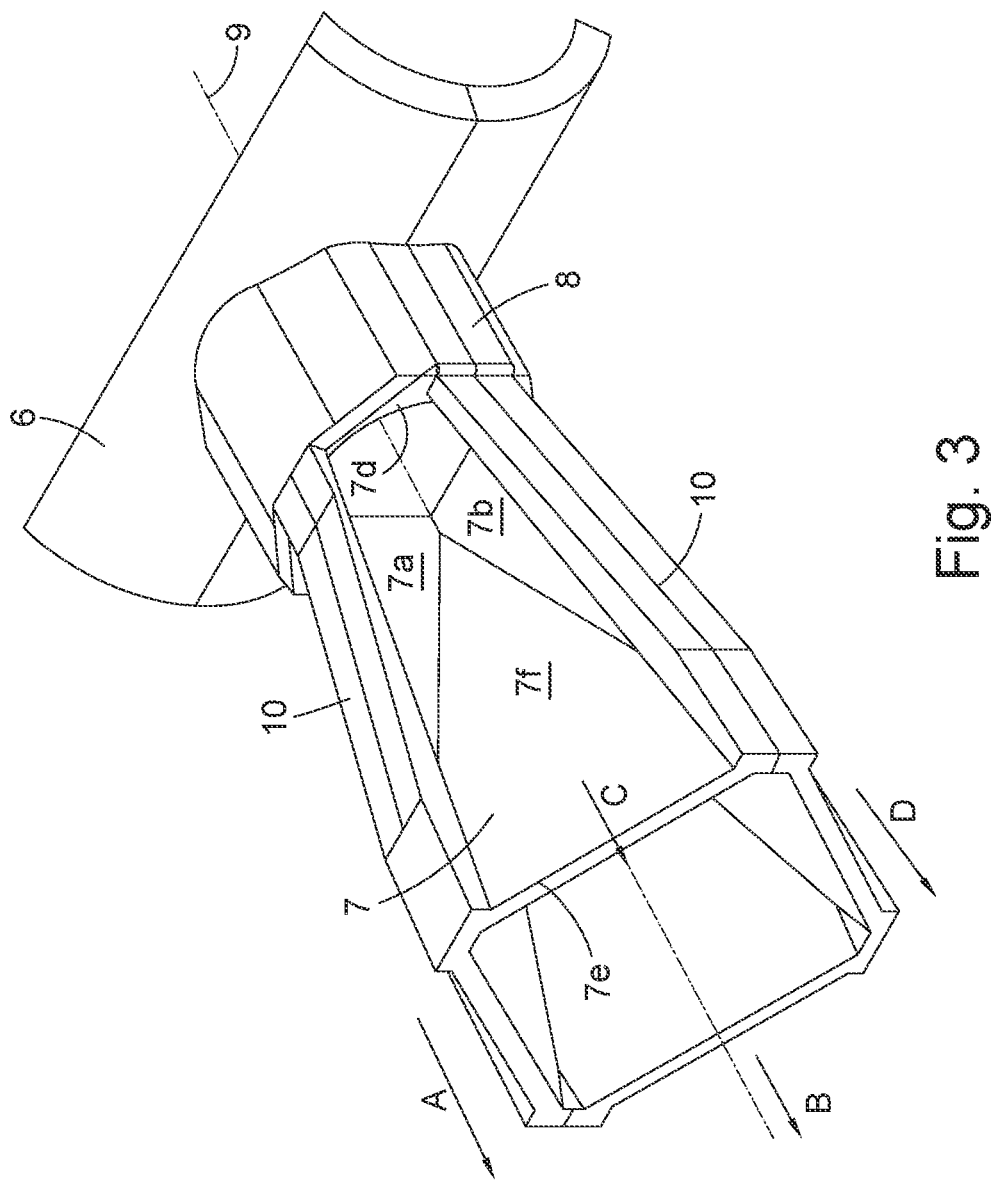
FIG. 3 is a perspective view of a second embodiment of a nozzle in accordance with the invention.
Figure 4:
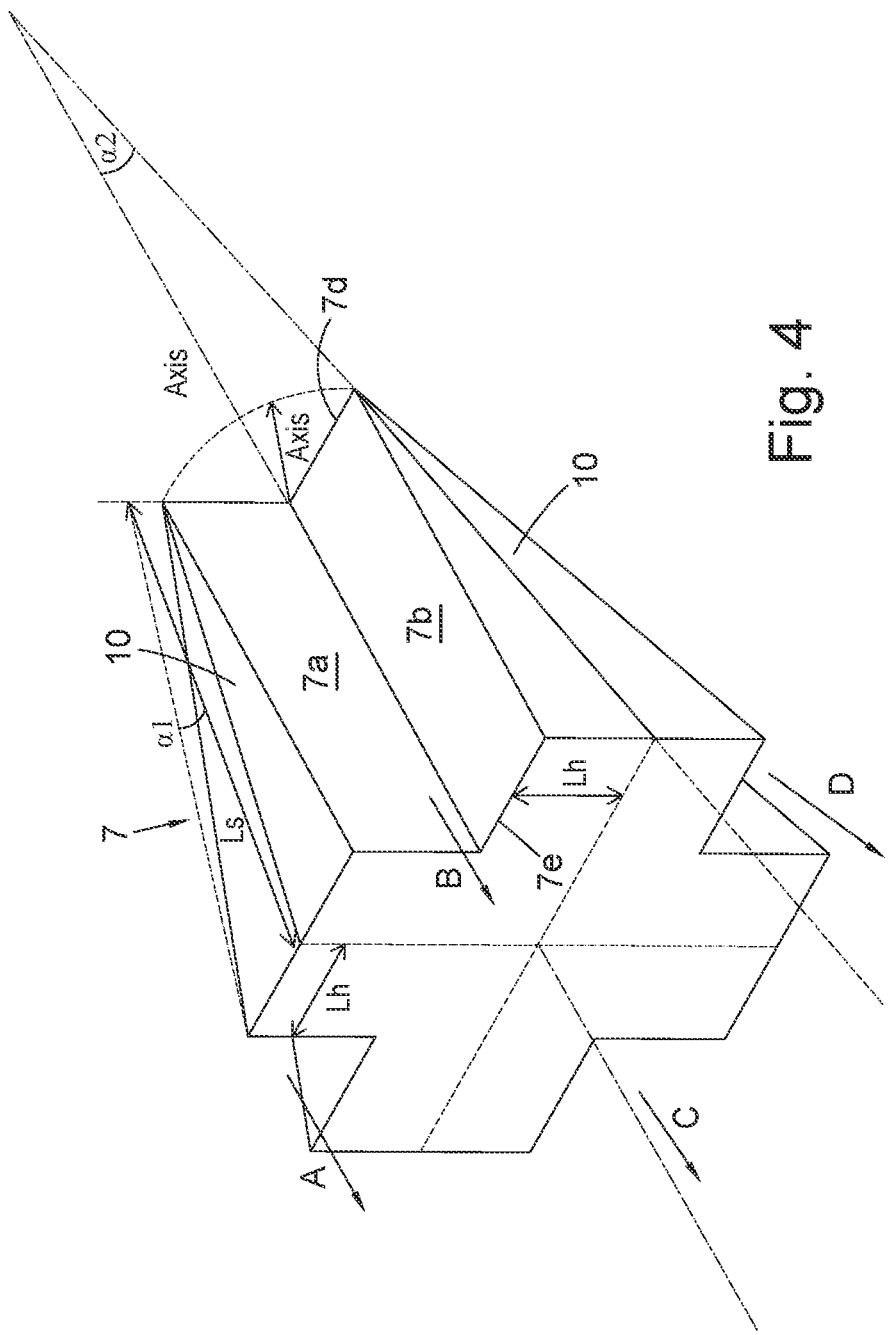
FIG. 4 is a diagram of the nozzle geometry of an alternative configuration of nozzle in accordance with the invention.

As illustrated in FIGS. 2-4, in the present invention, the nozzle utilizes a splitter nozzle portion 7 with a stellate or pyramidal wedge—typically, but not exclusively, three or four-pointed/sided. The splitter nozzle portion is placed flow-wise downstream of a single converging or convergent-divergent (typically) round stub nozzle 8. The leading edge of the splitter may be coincident with the nozzle exit plane or a few (e.g. 5-15) millimetres downstream. The splitter deflects and divides the flow issuing from a single nozzle into multiple (three or more) streams angled away from the nozzle axis 9, thus allowing increased entrainment due to the increased surface area of the shear layer. Side plate spacers 10 may be used to attach the splitter to the stub nozzle. In some configurations these also aid the jet/airstream separation.

The angle at which the jets/airstreams diverge, whether and where they subsequently re-combine to form a single jet with a non-circular cross-section, is controlled by splitter angles, length, position, cross-section shape and (optionally) side plates spacers 10. CFD simulation and experimental testing can be used to determine the effect of these parameters on entrainment ratio and jet cross-section. In this way, a nozzle with specific values of these parameters can be used provide the optimum cleaning flow for a given filter size and/or shape.

The various parameters of the splitter nozzle portion 7, the spacing from the sub nozzle portion 8, and the geometry of the stub nozzle portion 8 can be tailored to provide the required jet shape and entrainment characteristics. A beneficial feature of the nozzle designs is that jet entrainment and recombination of flows can be specified for different shaped filters.

Referring now to the specific nozzle configuration of FIG. 2, the arrangement has a saddle 6 for mounting to the blowpipe 3, with the axis 9 co-aligned with the axis of an outlet aperture in the blowpipe 3. The splitter portion 7 is mounted to the stub nozzle portion by means of side plate spacers 10, and the splitter portion 7 has deflector surfaces 7a, 7b inclined axially outward from the axial direction of the airflow exiting the stub nozzle portion 8. In the arrangement shown in FIG. 2, the deflector surfaces of the splitter portion 7 direct substantially all the air exiting the stub nozzle portion 8 into three separate streams (A, B, C), each of which airstreams is directed inclined axially outward from the axial direction of the airflow exiting the stub nozzle 8. Separate pairs of deflector surfaces 7a, 7b effectively define separate airstream channels for each of the airstreams (A, B, C). Substantially all the axially flowing air exiting the stub nozzle 8 is therefore deflected (in a separate respective airstream channel) axially outwardly at a uniform airstream direction for each of the three airflows (A, B, C). The deflector surfaces 7a, 7b inclined axially outward intersect at a longitudinally extending intersection line 7c, which is also inclined axially outward from the axial direction of the airflow exiting the stub nozzle portion 8.

In this embodiment, the separate airstreams are separated at a common leading edge 7d of the splitter portion 7, which is contiguous with the single outlet opening of the stub nozzle portion 8. To an extent this is enhanced by the spacer side plates 10 separating the airflow into the separate airstreams (A, B, C) at that common leading edge 7d. The deflector surfaces 7a, 7b for each of the airstreams (A, B, C) are inclined to a common angle of inclination, as are the intersection lines 7c and the side plate spacers 10. The width of the side plate spacers 8 inclination of the surfaces 7a, 7b and/or the side plate spacers 10, can be tailored to modify the entrainment characteristics and downstream airstream recombination characteristics for the nozzle at given flow rates. The splitter nozzle portion 7 has a trailing edge 7e, and the initial jet/airstream trajectory is established by the deflector surfaces 7a, 7b before the airstream passes over the trailing edge 7e.

This embodiment is particularly adapted for use in a system designed to clean triangular cross-sectional tapering filters. However, the embodiment is also suitable for use with cylindrical or conical filters.

The embodiment shown in FIG. 3 is particularly adapted to clean square cross-sectional filters such as pyramid geometry filters, and shares many characteristics with the nozzle embodiment of FIG. 2. The arrangement is arranged to have a splitter portion 7 which has splitter surfaces 7a, 7b. The splitter surfaces 7a, 7b direct the airflow to lead into a planar deflector surface 7f, which is inclined axially outward to a trailing edge 7e. In the arrangement shown in FIG. 3, the deflector surfaces of the splitter portion 7 direct substantially all the air exiting the stub nozzle portion 8 into four separate streams (A, B, C, D), each of which airstreams is directed inclined axially outward from the axial direction of the airflow exiting the stub nozzle 8. Separate groups of splitter and deflector surfaces 7a, 7b, 7f effectively define separate airstream channels for each of the airstreams (A, B, C, D). Substantially all the axially flowing air exiting the stub nozzle 8 is therefore deflected (in a separate respective airstream channel) axially outwardly at a uniform airstream direction for each of the four airflows (A, B, C, D).

In this embodiment, the separate airstreams are separated at a leading edge 7d of the splitter portion 7, which is contiguous with the single outlet opening of the stub nozzle portion 8. This is enhanced/maintained by the spacer side plates 10 separating the airflow into the separate airstreams (A, B, C, D) at the leading edge 7d. The deflector surfaces 7f for each of the airstreams (A, B, C, D) are inclined to a common angle of inclination, as are the side plate spacers 10. The width of the side plate spacers 8 inclination of the surfaces 7f and/or the side plate spacers 10 can all be tailored to modify the entrainment characteristics and downstream airstream recombination characteristics for the nozzle at given flow rates. The splitter nozzle portion 7 has a trailing edge 7e, and the initial jet/airstream trajectory is established by the deflector surfaces before the airstream passes over the trailing edge 7e.

FIG. 4 shows schematically the geometry of an alternative nozzle splitter portion 7 that can be used to split the airflow into four separate airstreams (A, B, C, D). The arrangement is arranged to have a splitter portion 7 which has deflector surfaces 7a, 7b inclined axially outwardly from the axial direction of the airflow exiting the stub nozzle portion 8. In the arrangement shown in FIG. 4, the deflector surfaces of the splitter portion 7 direct substantially all the air exiting the stub nozzle portion 8 into four separate streams (A, B, C, D), each of which airstreams is directed inclined axially outward from the axial direction of the airflow exiting the stub nozzle

8. Separate pairs of deflector surfaces 7*a*, 7*b* effectively define separate respective airstream channels for each of the airstreams (A, B, C, D). Substantially all the axially flowing air exiting the stub nozzle 8 is therefore deflected (in a separate respective airstream channel) axially outward at a uniform airstream direction for each of the four airflows (A, B, C, D).

In this embodiment, the separate airstreams are separated at a leading edge 7*d* of the splitter portion 7, which is contiguous with the single outlet opening of the stub nozzle portion 8. This is achieved by the spacer side plates 10 separating the airflow into the separate airstreams (A, B, C, D) at the leading edge 7*d*. The deflector surfaces 7*a*, 7*b* for each of the airstreams (A, B, C, D) are inclined to a common angle of inclination as are the side plate spacers 10. The width of the side plate spacers 10 inclination of the surfaces 7*a*, 7*b* and/or the side plate spacers 10 can all be tailored to modify the entrainment characteristics and downstream airstream recombination characteristics for the nozzle at given flow rates. The splitter nozzle portion 7 has a trailing edge 7*e*, and the initial jet/airstream trajectory is established by the deflector surfaces before the airstream passes over the trailing edge 7*e*. In this embodiment, the side plate spacers 10 taper from a relatively narrower portion near the stub portion 8 to a relatively wider portion towards the trailing edge 7*e* in a similar manner to the embodiment of FIG. 2.

The geometry of the nozzle of FIG. 4 is defined by parameters as follows:
De Stub nozzle portion 8 outlet diameter
Lh Splitter nozzle portion 7 half height
Ls Splitter portion 7 length
Rs Radius of circle circumscribing splitter portion leading edge 7*d*
Xo Axial distance between stub nozzle portion 8 exit plane and splitter nozzle portion 7 leading edge
$\alpha 1$ Splitter half angle
$\alpha 2$ Splitter divergence half angle $$Rs > De/2$$

$$\mathrm{Tan}(\alpha) = Lh/Ls$$

Figure 5:
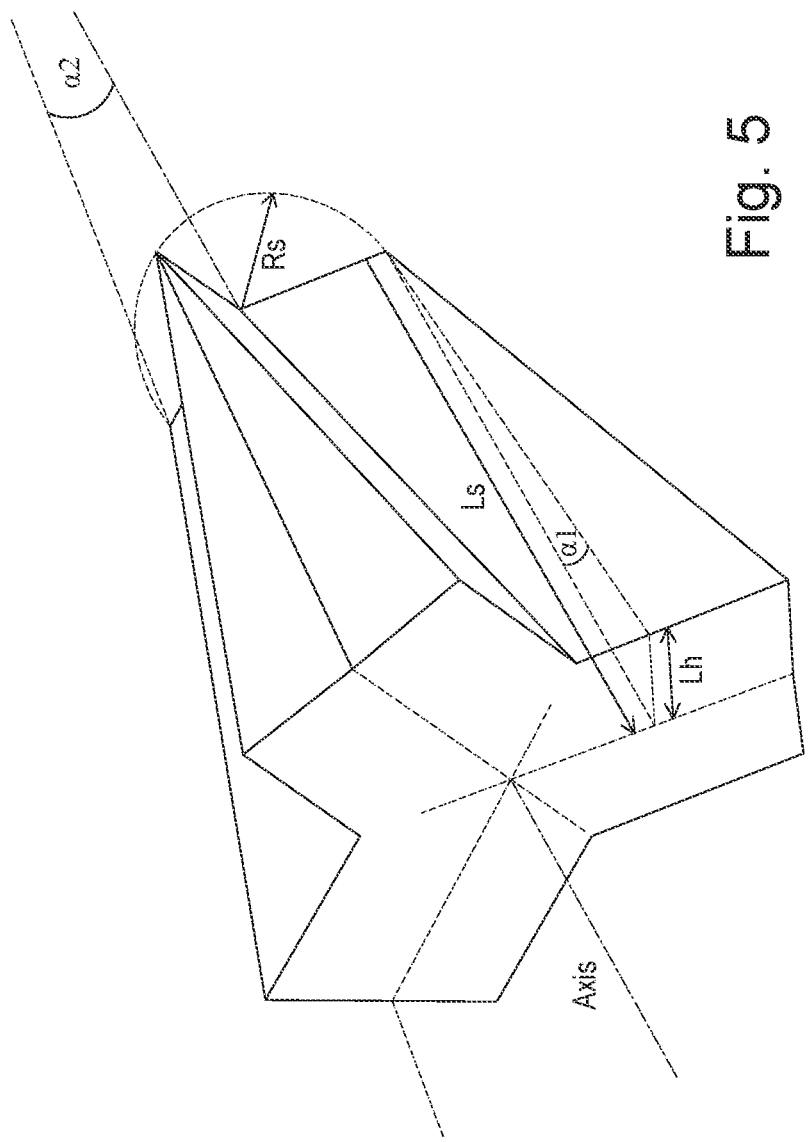
FIG. 5 is a diagram of the nozzle geometry of an exemplary 3-way splitter nozzle in accordance with the invention.
Figure 6:
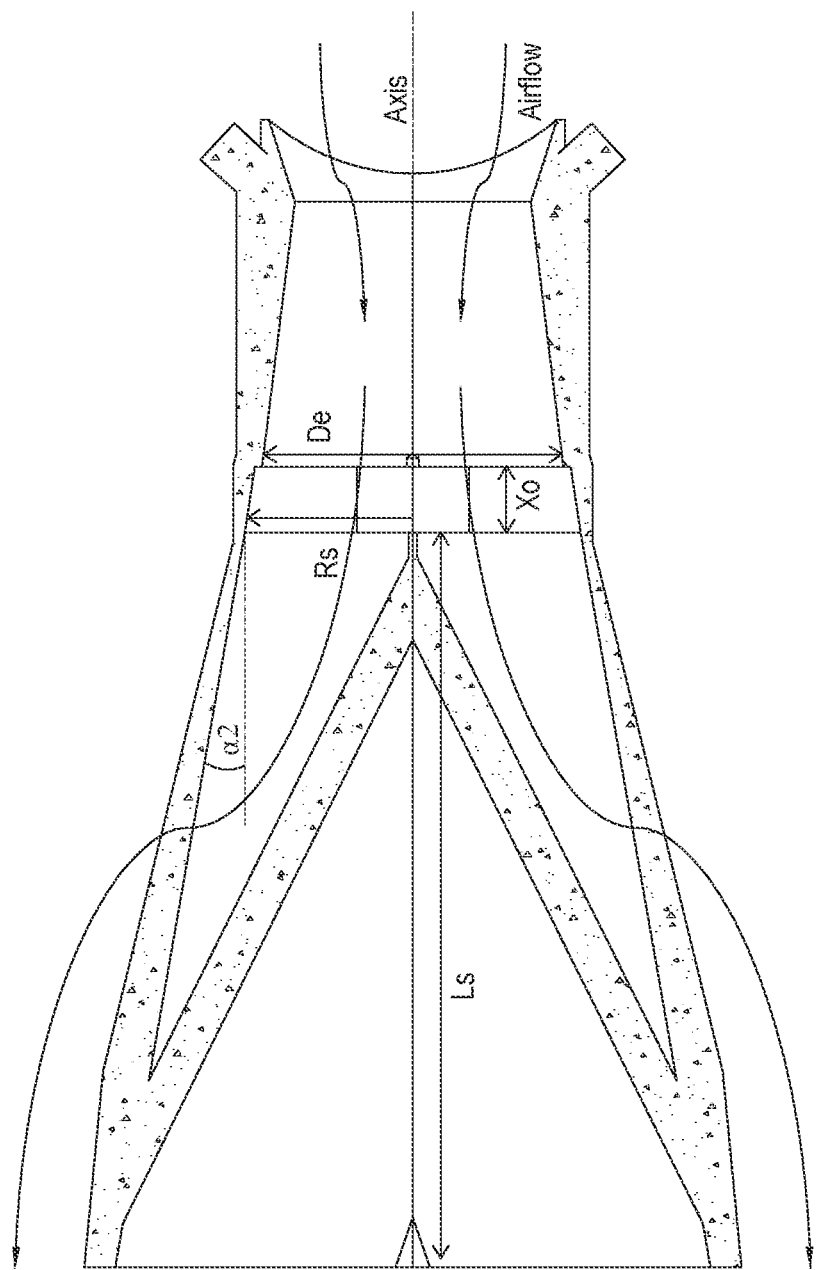
FIG. 6 is a sectional view through a 4-way splitter nozzle such as that shown in FIG. 3.

These geometrical parameters are also identified in FIGS. 5 and 6 for the nozzle designs shown in each of these figures, respectively.

The various parameters of the splitter nozzle can be tailored to provide the required jet shape and entrainment characteristics.

In FIG. 6, the airflow through the sectional view through the nozzle is shown.

What is claimed is:

1. A nozzle for a filter cleaning system, the nozzle comprising:
   i) a stub portion having an inlet opening and an outlet opening; and,
   ii) a splitter portion positioned downstream of the stub portion along a longitudinal axis of the nozzle; wherein the splitter portion has deflector surfaces arranged to direct airflow exiting the stub portion outlet in three or more separate airstreams, each of which airstreams are directed inclined axially outwardly from the axial direction of the airflow exiting the stub portion outlet opening;
   wherein the deflector surfaces directing each airstream are substantially planar, inclined surfaces and at least two of the deflector surfaces for each airstream define an airstream channel; wherein each airstream channel is of substantially the same shape and configuration as the other separate airstream channels of the nozzle; and wherein the stub portion and the splitter portion are arranged such that substantially all the airflow exiting the stub portion is deflected by the splitter portion, into one of the three or more separate airstreams.

2. The nozzle according to claim 1, wherein for each airstream, the two or more inclined surfaces meeting at one or more intersections.

3. The nozzle according to claim 2, wherein the intersections are linear and are inclined axially outwardly from the axial direction of the stub portion.

4. The nozzle according to claim 1, wherein the stub portion has a single/common outlet opening, which single/common outlet opening directs the airflow onto each of the deflector surfaces.

5. The nozzle according to claim 1, wherein the outlet opening of the stub portion comprises a circular aperture.

6. The nozzle according to claim 1, wherein the splitter portion is formed to have spacer sections to separate the separate airstreams.

7. The nozzle according to claim 6, wherein the spacer sections extend between adjacent deflector surfaces of the separate airstreams.

8. The nozzle according to claim 6, wherein the spacer sections extend longitudinally along the length of the splitter portion and are inclined axially outwardly from stub axis.

9. The nozzle according to claim 8, wherein the spacer sections are each inclined axially at the same angle of inclination.

10. The nozzle according to claim 6, wherein the spacer sections extend from the stub portion.

11. The nozzle according to claim 1, wherein the splitter portion has a deflector surface leading edge orthogonal to the longitudinal axis of the nozzle, in which the airflow exiting the stub outlet opening is split into the separate airstreams at a common point along the longitudinal axis of the nozzle.

12. The nozzle according to claim 1, wherein the splitter portion has a deflector surface leading edge in which the airflow exiting the stub outlet opening is split into the separate airstreams, the leading edge being positioned contiguous with the outlet opening of the stub portion.

13. The nozzle according to claim 1, wherein the splitter portion has a deflector surface leading edge orthogonal to the longitudinal axis of the nozzle, in which the airflow exiting the stub outlet opening is split into the separate airstreams, the deflector surface leading edge extending radially from the axis of the nozzle, across the entirety of the outlet opening of the stub portion.

14. A filter cleaning system, including a nozzle according to claim 1.

15. The filter cleaning system according to claim 14, and further comprising a source of compressed air and means for delivering the compressed air to the nozzle.

16. The filter cleaning system according to claim 14, and further comprising a pulsation system for pulsing the air delivered to the nozzle.

17. A filtration system comprising a filter mounted in a filter housing adjacent a filter cleaning system in accordance with claim 14.

18. The filter cleaning system as in claim 1, wherein the airstream channels are contiguous to one another and equally spaced around the splitter portion.

19. The filter cleaning system as in claim 18, wherein each airstream channel is separated from an adjacent airstream channel by a side plate.

20. A nozzle for a filter cleaning system, the nozzle comprising:
   i) a stub portion having an inlet opening and an outlet opening; and,
   ii) a splitter portion positioned downstream of the stub portion outlet opening along a longitudinal axis of the nozzle; wherein the splitter portion has deflector surfaces arranged to direct airflow exiting the stub portion outlet opening in three or more separate airstreams, each of which airstreams are directed inclined axially outwardly from the axial direction of the airflow exiting the stub portion outlet opening;
      wherein the splitter portion has a deflector surface leading edge which splits airflow exiting the stub outlet into the three or more separate airstreams, the deflector surface leading edge extending radially from the axis of the nozzle across the entirety of the outlet opening of the stub portion, to define the three or more airstreams.

21. The filter cleaning system according to claim 20, wherein the deflector surface leading edge splits the airflow exiting the stub outlet opening into the separate airstreams at a common point along the longitudinal axis of the nozzle.

22. The filter cleaning system according to claim 20, wherein the deflector surface leading edge is positioned contiguous with the outlet opening of the stub portion.

23. The filter cleaning system according to claim 20, wherein the deflector surface leading edge extends radially in three or more directions from the axis of the nozzle across the outlet opening of the stub portion, to define the three or more airstreams.

24. A nozzle for a filter cleaning system, the nozzle comprising:
   iii) a stub portion having an inlet opening and an outlet opening; and,
   iv) a splitter portion positioned downstream of the stub portion along a longitudinal axis of the nozzle; wherein the splitter portion has deflector surfaces arranged to direct airflow exiting the stub portion outlet in three or more separate airstreams, each of which airstreams are directed inclined axially outwardly from the axial direction of the airflow exiting the stub portion outlet opening;
      wherein the deflector surfaces directing each airstream are substantially planar surfaces and the deflector surfaces for each airstream define an airstream channel; wherein each airstream channel is of substantially the same shape and configuration as the other separate airstream channels of the nozzle; with each airstream channel being defined by a pair of inclined deflector surfaces extending in adjacent relation to one another and intersecting along a longitudinally extending intersection line, the deflector surfaces of each channel inclined axially outward from the axial direction of airflow, from a leading edge orthogonal to the longitudinal axis of the nozzle to a distal edge; and wherein the stub portion and the splitter portion are arranged such that airflow exiting the stub portion is deflected by the splitter portion, into one of the three or more separate airstreams.

25. The nozzle as in claim 24, wherein the leading edge of the deflector surface of each airstream channel is contiguous with the stub portion outlet opening.

26. The nozzle as in claim 24, wherein the leading edges of the deflector surfaces of all of the airstream channels intersect along a point along the longitudinal axis of the nozzle to split the airflow exiting the stub outlet opening into the separate airstreams at a common point along the longitudinal axis of the nozzle.

* * * * *